G. E. JENKS.
Flower-Trellis.
No. 212,604.　　　Patented Feb. 25, 1879.
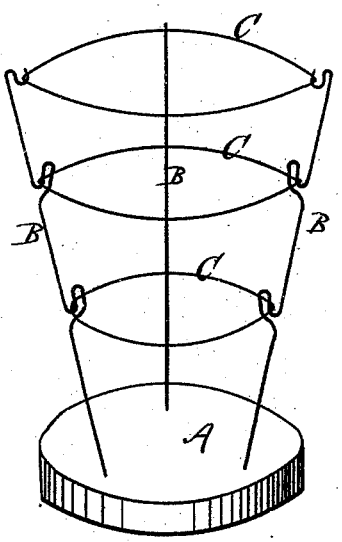
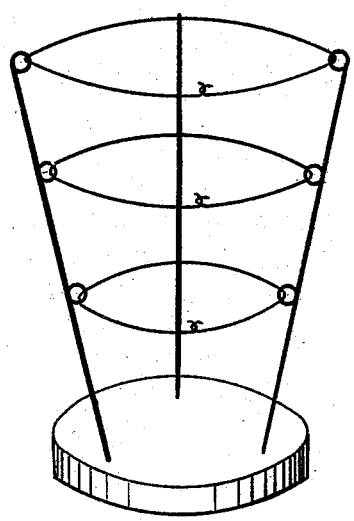
WITNESSES.　　　INVENTOR.

UNITED STATES PATENT OFFICE.

GEORGE E. JENKS, OF CONCORD, NEW HAMPSHIRE.

IMPROVEMENT IN FLOWER-TRELLISES.

Specification forming part of Letters Patent No. 212,604, dated February 25, 1879; application filed May 29, 1877.

*To all whom it may concern:*

Be it known that I, GEORGE EDWIN JENKS, of the city of Concord, county of Merrimack, and State of New Hampshire, have invented a new and Improved Trellis for Flowers, &c., which I call the "Ring Flower-Trellis," of which the following is a specification:

The nature of my invention is that of a device made of iron, wood, or other substance in the form of a series of rings, supported in a peculiar manner by standards, which are so made as that the lower ends can be pressed or driven into the ground, the rings being readily removable from the standards; and the object is to furnish a means to support or protect growing plants, such as vines, &c., which have feeble trunks or roots.

Referring to the drawings, Figure 1 shows a view, in perspective, of one form of my device. Fig. 2 is a similar view of a modification of the same.

In the drawings, A, Fig. 1, is a platform, used to display the trellis, but, in practice, dispensed with, the sharpened lower ends of the three supports B B B, Fig. 1, which are made of wire, (or otherwise,) being driven into the ground. These three supports are seen in the drawings to be, at a little way from their lower ends, bent for a short distance, so as to be doubled, the doubled portion curving upward and inward in the form of a hook, going perpendicularly up and then slightly curved backward. The supports, respectively, then continue (a single wire or rod) upward for a little distance, and are again bent into a similar hook. Three of these hooks are seen in the drawings to each support; but I do not confine myself to any special number of the hooks or of the supports, and I sometimes cause my hooks to curve outward instead of as represented; and I sometimes make my supports of sheet metal, corrugated bayonet fashion, and sometimes of cast-iron. Resting upon the lower parts of these hooks are seen in the drawings three rings, C C C, of iron or other material, which I sometimes make broken, forming the ends into hooks, so as to fasten and complete a circle, which rings (not necessarily circular, sometimes of other shapes) are held by the three supports B B B, and, it is to be specially noted, can instantaneously be removed by simply lifting them up. This peculiarity of the optional removal of the horizonally-placed rings from the supports is one main feature of my invention.

I sometimes, instead of making the rings unbroken, and using the hooks shown to sustain them, and yet permit their ready removal, make my supports as shown in Fig. 2, letting the supports curve circularly, so as to form a circle, as shown in Fig. 2, and secure the easy removal of the rings by making them broken with a hook at each end. The rings, in this case, pass one end through the circles, respectively, of the supports, and, after passing through all, are hooked together by their curved ends.

By pressing the rings together the ring-hooks are readily disengaged from each other, and then the rings are removed.

I do not confine myself to any special mode of holding up the rings by means of the supports, using sometimes a loop of wire, or of sheet-iron, or tin instead of the hooks shown; and when I use one or more cast-iron supports I cast a ledge or ear of any convenient form on the outside or inside of the standard or standards. I sometimes make these ledges detachable, and fasten the rings sometimes by means of pins or rivets.

When I make the supports of wood I saw a diagonal slit in the sides of the same. In using the hooked rings I sometimes bore the supports with holes, and sometimes, with either rings, I make a slit in the top of the supports, respectively, for the upper ring-support.

The rings C C C are sometimes made of a flat piece of metal, and of any proper substance.

The operation is the following: The supports are pressed or driven into the ground, either around the plant to be protected or at the side of it, and the rings of Fig. 1 or of Fig. 2, according to the form or the supports, are placed in position, as shown. The plant, in growing, is held up from prostration by the wind or by its own weight by resting laterally against the supports or the rings, or by its tendrils twining on either or both, and at the same time the ready access of air, moisture, and sunshine to the foliage is effectually procured.

I do not claim the device of stakes bearing horizontal arms, whether with or without terminal hooks.

I do not claim any device wherein detachable loops, tags, or other devices are used to attach straight wires or strings to a support.

I do not confine myself to a circular form for the horizontal parts of my device, but make them sometimes of oval or other shape; and I make my rings sometimes of a band as well as a wire.

I claim—

In flower-trellises, the combination of the upright supports, having suitable rests or shoulders, with the detachable horizontal pieces formed as rings, all when constructed and arranged substantially as described and shown.

GEORGE EDWIN JENKS.

Witnesses:
    JEROME DAVIS,
    LEMUEL P. JENKS.